(12) United States Patent
Zhao et al.

(10) Patent No.: US 10,505,454 B2
(45) Date of Patent: Dec. 10, 2019

(54) CROSS REGULATION REDUCTION IN SINGLE INDUCTOR MULTIPLE OUTPUT (SIMO) SWITCHING DC-DC CONVERTERS

(71) Applicant: Cirrus Logic International Semiconductor Ltd., Edinburgh (GB)

(72) Inventors: Xin Zhao, Austin, TX (US); John L. Melanson, Austin, TX (US); Eric King, Dripping Springs, TX (US); Xiaofan Fei, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 16/226,454

(22) Filed: Dec. 19, 2018

(65) Prior Publication Data

US 2019/0199215 A1 Jun. 27, 2019

Related U.S. Application Data

(60) Provisional application No. 62/609,361, filed on Dec. 22, 2017.

(51) Int. Cl.
*H02M 3/158* (2006.01)
*G05F 1/62* (2006.01)
(Continued)

(52) U.S. Cl.
CPC ............ *H02M 3/1582* (2013.01); *G05F 1/62* (2013.01); *H02M 3/158* (2013.01); *H02M 3/157* (2013.01);
(Continued)

(58) Field of Classification Search
CPC ..... H02M 2001/008; H02M 2001/009; H02M 3/158; H02M 3/1582; G05F 1/577
See application file for complete search history.

(56) References Cited

U.S. PATENT DOCUMENTS 5,617,015 A 4/1997 Goder et al.
6,075,295 A 6/2000 Li
(Continued)

OTHER PUBLICATIONS

Patra, P. et al., "Control scheme for reduced cross-regulation in single-inductor multiple-output DC-DC converters," IEEE Trans. Ind. Electron., vol. 60, No. 11, pp. 5095-5104, Nov. 2013.
(Continued)

*Primary Examiner* — Gary L Laxton
(74) *Attorney, Agent, or Firm* — Norton Rose Fulbright US LLP (57) ABSTRACT

The overall performance of single input multiple output (SIMO) switching DC-DC power converters may be improved by controlling power and output switches to adjust inductor current delivered to one output while maintaining substantially constant the current delivered to other outputs, thereby reducing cross regulation interference across outputs. Power converter systems of this disclosure may be configured to calculate an inductor current value and a duty cycle value based on voltages at each of the voltage outputs. The power converter systems may be configured to control at least one main power switch to increase or decrease the current in the inductor based on the calculated inductor current value. Additionally, the power converter systems may be configured to control at least one output power switch to divert current from the inductor to one of the plurality of output nodes based on the calculated duty cycle value.

20 Claims, 4 Drawing Sheets

(51) Int. Cl.
*H02M 3/157* (2006.01)
*H02M 1/00* (2006.01)
(52) U.S. Cl.
CPC ............... *H02M 2001/0009* (2013.01); *H02M 2001/009* (2013.01)

(56) References Cited

U.S. PATENT DOCUMENTS

| | | | |
|---|---|---|---|
| 6,222,352 | B1 | 4/2001 | Lenk |
| 6,437,545 | B2 | 8/2002 | Sluijs |
| 6,900,620 | B2 | 5/2005 | Nishimori et al. |
| 6,977,447 | B2 | 12/2005 | May |
| 7,176,661 | B2 | 2/2007 | Kranz |
| 7,432,614 | B2 | 10/2008 | Ma et al. |
| 8,049,472 | B2 | 11/2011 | Easwaran et al. |
| 8,564,155 | B2 | 10/2013 | Wibben |
| 8,624,429 | B2 | 1/2014 | Jing et al. |
| 8,773,088 | B2 | 7/2014 | Menegoli et al. |
| 8,975,879 | B2 | 3/2015 | Xu et al. |
| 9,118,246 | B2 | 8/2015 | Buthker |
| 2006/0220622 | A1 | 10/2006 | Yamanaka et al. |
| 2008/0231115 | A1 | 9/2008 | Cho et al. |
| 2011/0187189 | A1 | 8/2011 | Moussaoui et al. |
| 2013/0162228 | A1* | 6/2013 | Menegoli ............... H02M 3/158 323/267 |
| 2015/0188434 | A1* | 7/2015 | Ouyang ................ H02M 3/158 323/267 |

OTHER PUBLICATIONS

Dasika, J.D. et al., "Multivariable Control of Single-Inductor Dual-Output Buck Converters," Power Electronics, IEEE Transactions on, On pp. 2061-2070 vol. 29, Issue: 4, Apr. 2014.

Le, H.P. et al., "A Single-Inductor Switching DC-DC Converter with 5 Outputs and Ordered Power-Distributive Control," IEEE Int. Solid-State Circuits Conf., pp. 534-620, 2007.

Bonizzoni, E. et al., "A 200mA 93% Peak Efficiency Single-Inductor Dual Output DC-DC Buck Converter," IEEE International Solid-State Circuits Conf. (ISSCC) Dig. Tech. Papers. pp. 526-619, Feb. 2007.

Lee, Yu-Huei et al., "Minimized Transient and Steady-State Cross Regulation in 55-nm CMOS Single-Inductor Dual-Output (SIDO) Step-Down DC-DC Converter," Solid-State Circuits, IEEE Journal of, On pp. 2488-2499 vol. 46, Issue: 11, Nov. 2011.

Xu, W. W. et al, "A dual-mode single-inductor dual-output switching converter with small ripple," IEEE Trans. Power Electron., vol. 25, No. 3, pp. 614-623, Mar. 2010.

Belloni, M. et al., "A 4-Output Single-Inductor DC-DC Buck Converter with Self-Boosted Switch Driver and 1.2A Total Output Current," to appear in 2008 IEEE International Solid-State Circuits Conf. (ISSCC) Dic. Tech. Papers.

Trevisan, D. et al., "Digital Control of Single-Inductor Multiple-Output Step-Down DC-DC Converter in CCM" in IEEE Trans. Ind. Electron., vol. 55, No. 9, pp. 3476-3483, Sep. 2008.

Belloni, M. et al., "On the design of single-inductor multiple-output DC-DC buck converters," IEEE Int. Symp. Circuits and Systems, pp. 3049-3052, May 2008.

\* cited by examiner

CROSS REGULATION REDUCTION IN SINGLE INDUCTOR MULTIPLE OUTPUT (SIMO) SWITCHING DC-DC CONVERTERS

CROSS-REFERENCE TO RELATED PATENT APPLICATIONS

This patent application claims the benefit of U.S. Provisional Patent Application No. 62/609,361 filed on Dec. 22, 2017, and entitled "Cross Regulation Reduction In Single Inductor Multiple Output (Simo) Switching Dc-Dc Converters," which is hereby incorporated by reference.

FIELD OF THE DISCLOSURE

The instant disclosure relates to power converters. More specifically, portions of this disclosure relate to cross regulation reduction in single inductor multiple output (SIMO) switching DC-DC converters.

BACKGROUND

Traditional switching direct current-direct current (DC-DC) power converters that use a single inductor have a single input and a single output. To reduce area and cost through the use of fewer components, DC-DC converters that provide multiple outputs while still using a single inductor have been developed. Such DC-DC converters are often termed single inductor multiple output (SIMO) switching DC-DC converters. Sharing an inductor between multiple outputs is beneficial because the inductor is a large component that is difficult to reduce in size in comparison to other components of an integrated circuit around the inductor.

Numerous drawbacks are associated with SIMO switching DC-DC converters. For example, because multiple outputs share the same inductor, a load transient on one output can change the current delivered to other outputs. This phenomenon, known as cross regulation, reduces the overall performance of traditional SIMO switching DC-DC converters. Accordingly, current SIMO switching DC-DC converters are less than optimal.

Shortcomings mentioned here are only representative and are included simply to highlight that a need exists for improved electrical components, particularly for improved power converters employed in consumer-level devices, such as mobile phones. Embodiments described herein address certain shortcomings but not necessarily each and every one described here or known in the art.

SUMMARY

The overall performance of SIMO switching DC-DC power converters may be improved by controlling power and output switches to adjust inductor current delivered to one output while maintaining a substantially constant current delivered to other outputs, thereby reducing cross regulation interference across outputs of a SIMO switching DC-DC power converters. Cross regulation interference may be reduced, in some embodiments described below, by calculating values and controlling delivery of current from the inductor to one of the multiple outputs of the converter based on the calculated values. For example, a duty cycle value for delivery of power to each of the nodes may be calculated based on a voltage at each of the output nodes of the SIMO converter.

An example SIMO switching DC-DC power converter system may include an inductor with at least one main power switch coupled to the inductor. The system may also include a plurality of output nodes with at least one output power switch coupled to at least one of the plurality of output nodes. The system may further include a controller coupled to the main power switch and coupled to the output power switch, and the controller may be configured to regulate the DC-DC converter to generate a DC voltage at each of the plurality of output nodes. The controller may perform regulation by calculating an inductor current value based on a voltage at each node of the plurality of output nodes, by calculating a duty cycle value based on the output node voltages, by controlling the main power switch to increase or decrease current in the inductor based on the calculated inductor current value, and by controlling the output power switch to divert current from the inductor to one of the output nodes based on the calculated duty cycle value.

The controller may perform steps to reduce transients on one output of the SIMO converter from affecting other outputs. For example, in certain embodiments, the controller may be further configured to perform the step of adjusting an average current of at least one node of the plurality of output nodes while maintaining an average current at other nodes of the plurality of output nodes. In another embodiment, the calculated duty cycle value may be based, at least in part, on a measured voltage on each of the plurality of output nodes, and the calculated inductor current value may be based, at least in part, on a measured voltage on each of the plurality of output nodes.

The controller may perform steps to handle extreme cases, such as when a duty cycle values approaches the zero or one or when a first load at one output node is significantly different from a second load at another output node. For example, in some embodiments, the controller may be further configured to perform steps that include: detecting that the calculated duty cycle value is below a threshold value; controlling the at least one output power switch to divert current to an output node that has a voltage that is below a reference voltage; calculating the duty cycle value associated with the output node that has a voltage that is below the reference voltage based, at least in part, on a frequency with which the output node falls below the reference voltage; and calculating the inductor current value based, at least in part, on the frequency with which the output node falls below the reference voltage.

A method for operating a power circuit, such as a SIMO switching DC-DC power converter, to reduce cross regulation interference may include controlling an inductor configured to provide current to a plurality of output nodes by performing steps that include: calculating an inductor current value based, at least in part, on a voltage at each node of a plurality of output nodes; calculating a duty cycle value based, at least in part, on a voltage at each node of the plurality of output nodes; controlling at least one main power switch to increase or decrease the current in the inductor based, at least in part, on a calculated inductor current value; and controlling at least one output power switch to divert current from the inductor to one of the plurality of output nodes based, at least in part, on the calculated duty cycle value. In some embodiments, the method may further include adjusting an average current of at least one node of the plurality of output nodes while maintaining an average current at other nodes of the plurality of output nodes.

In certain embodiments, the method may also include: receiving a measured voltage for each of the plurality of output nodes, wherein the calculated duty cycle value may be based, at least in part, on the measured voltage for each of the plurality of output nodes, and wherein the calculated inductor current value may be based, at least in part, on the measured voltage for each of the plurality of output nodes.

In some embodiments, the method may further include: detecting that the calculated duty cycle value is below a threshold value; controlling the at least one output power switch to divert current to an output node that has a voltage that is below a reference voltage; calculating the duty cycle value associated with the output node that has a voltage that is below the reference voltage based, at least in part, on a frequency with which the output node falls below the reference voltage; and calculating the inductor current value based, at least in part, on the frequency with which the output node falls below the reference voltage.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed systems and methods, reference is now made to the following descriptions taken in conjunction with the accompanying drawings. In the appended figures, similar components or features may have the same reference label. Further, various components of the same type may be distinguished by following the reference label with a second label that distinguishes among the similar components. If just the first reference label is used in the specification, the description is applicable to any one of the similar components having the same first reference label irrespective of the second reference label.

DETAILED DESCRIPTION

Figure 1:
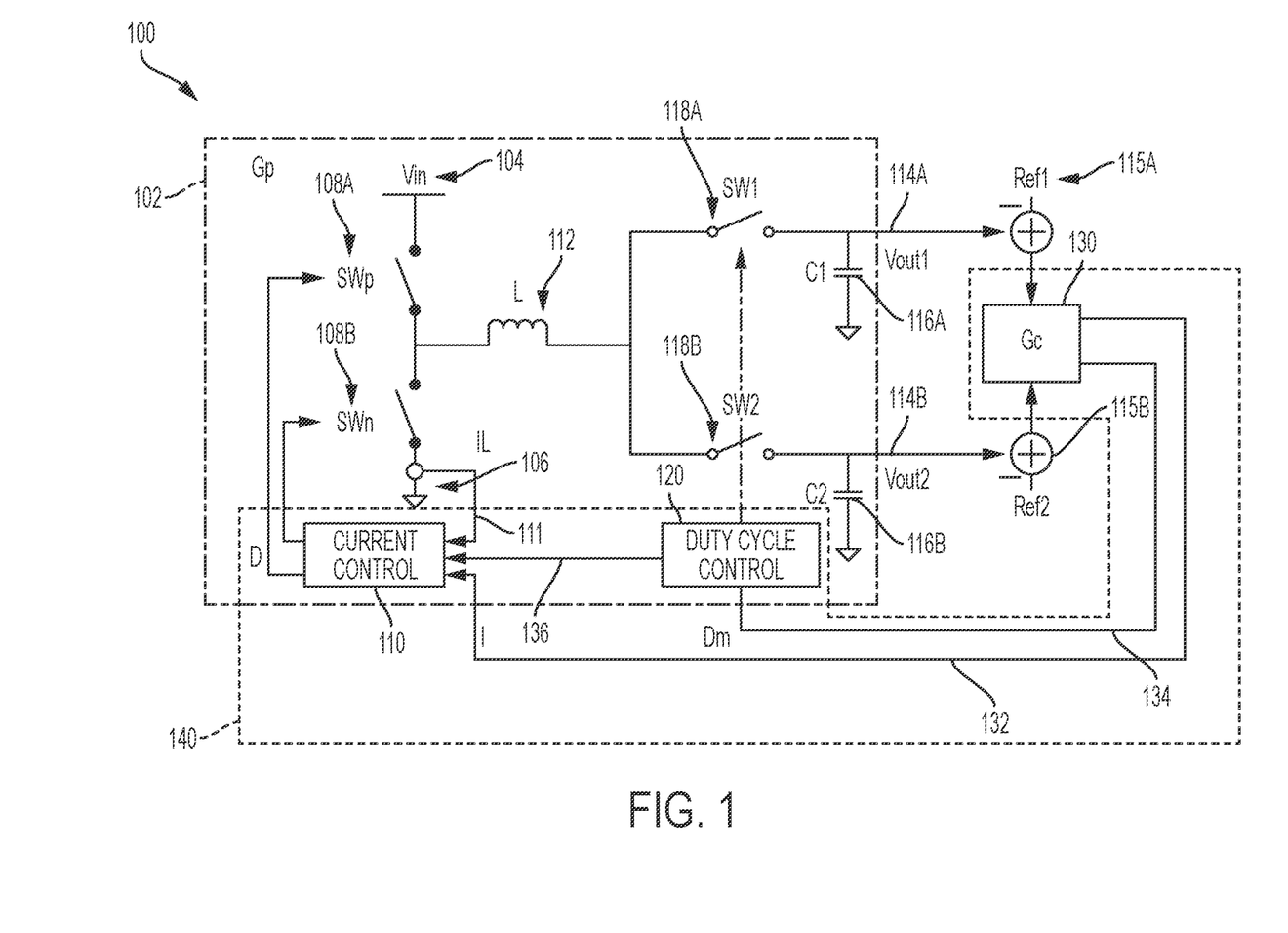
FIG. 1 is an example schematic block diagram illustrating a SIMO switching DC-DC converter system with cross regulation reduction according to some embodiments of the disclosure.

FIG. 1 is an example schematic block diagram illustrating a SIMO switching DC-DC converter system with cross regulation reduction according to one embodiment of the disclosure. In some embodiments, system 100 may be implemented as (or within) a controller integrated circuit (IC). The DC-DC converter system 100 includes a power converter 102. According to some embodiments, power converter 102 may include a single inductor dual output (SIDO) buck converter. Power converter systems may include an energy storage electrical component to effectuate the power conversion. For example, in the embodiment illustrated in FIG. 1, power converter 102 includes an inductor 112. The inductor 112 may be coupled through switches 108A and 108B to input power signals 104, 106. The input power signal 104 may be a signal from a power source that provides power to power converter 102. The input power signal 106 may be another power signal, such as a signal from which input power signal 104 is referenced. For example, input power signal 106 may be a ground signal. Main power switches 108A, 108B may be coupled to inductor 112 to control the transfer of power from input power signals 104, 106 to inductor 112. Main power switch 108A may control the transfer of power between input power signal 104 and inductor 112, and main power switch 108B may control the transfer of power between input power signal 106 and inductor 112. In some embodiments, main power switches 108 may be transistors.

The power converter 102 may include multiple output voltage signals to a plurality of output nodes. For example, power converter 102 may include two voltage outputs 114A, 114B. A capacitive loading of voltage outputs 114A, 114B may be represented by capacitors 116A, 116B, respectively. According to some embodiments, voltage output 114A and voltage output 114B may be different voltage values. In another embodiment, voltage output 114A and voltage output 114B may be the same voltage value. Output power switches 118A, 118B may be coupled to voltage outputs 114A, 114B, respectively, and operated to control the transfer of current from the inductor 112 to voltage outputs 114A, 114B and thus control the voltage values at voltage outputs 114A, 114B. Output power switch 118A may control the transfer of power between inductor 112 and output 114A, and output power switch 118B may control the transfer of power between inductor 112 and output 114B. In some embodiments, output power switches 118 may be transistors. Although only two output switches 118A, 118B are shown in FIG. 1, additional output switches may be included in the power converter 102 to obtain additional voltage outputs that share the inductor 112.

DC-DC converter system 100 may include a current control block 110. Current control block 110 may be configured to control main power switches 108. In some embodiments, current control block 110 may be a constant-on-time (COT) current controller. Current control block 110 may receive as an input a sensed inductor current, such as current sense signal $I_L$ 111. In some embodiments, the current may be sensed from a node coupled to one of the input power signals 104, 106. Current control block 110 may also or alternatively receive as another input a signal indicating a desired inductor current, such as inductor current control signal 132. Current control block 110 may also or alternatively receive as another input a signal indicating a desired inductor current switching cycle, such as inductor current switching cycle control signal 136, which specifies time periods during which current should be transferred to or from inductor 112. Current control block 110 may process the current sense signal 111, the inductor current control signal 132, and/or the inductor current switching cycle control signal 136 and, based on such processing, control the switching of main power switches 108A, 108B such that the current in inductor 112, as indicated by current sense signal 111, is approximately equal to the desired inductor current, as indicated by inductor current control signal 132. The approximately equal determination may be for a pre-defined time period during operation of the inductor 112.

DC-DC converter system 100 may also include a duty cycle control block 120. The duty cycle control block 120 may be configured to control output power switches 118A, 118B. In some embodiments, duty cycle control block 120 may be a delta-sigma modulator (DSM) controller operating at a provided clock frequency. Duty cycle control block 120 may receive as an input a signal indicating a desired duty cycle for one or more of output power switches 118A, 118B, such as a duty cycle control signal $D_m$ 134. Duty cycle control block may process the duty cycle control signal 134 and, based on such processing, control the switching of output power switches 118A, 118B. Accordingly, duty cycle control signal may be associated with the control of each of the plurality of output power switches 118A, 118B.

DC-DC converter system 100 may also include a feedback controller 130. The feedback controller 130 may be configured to generate inductor current control signal I 132 and duty cycle control signal $D_m$ 134. For example, feedback controller 130 may generate inductor current control signal 132 and duty cycle control signal 134 to reduce cross regulation interference between outputs 114. A more detailed description of the generation of the I and $D_m$ signals for some embodiments of the feedback controller 130 is described with reference to FIGS. 2-4.

In some embodiments, power converter 102, current control block 110, duty cycle control block 120, and feedback controller 130 may be developed as a single controller IC. In another embodiment, power converter 102, current control block 110, duty cycle control block 120, and feedback controller 130 may be developed as distinct control blocks. In yet another embodiment, one or more of power converter 102, current control block 110, duty cycle control block 120, and feedback controller 130 may be developed as distinct control blocks while others of the one or more power converter 102, current control block 110, duty cycle control block 120, and feedback controller 130 are developed as group. In addition, in some embodiments, different ones of the power converter 102, current control block 110, duty cycle control block 120, and feedback controller 130 may be operated based on a clock period while others of the power converter 102, current control block 110, duty cycle control block 120, and feedback controller 130 may be operated without a clock signal. In some embodiments, duty cycle control block 120 and feedback controller 130 may be operated based on a clock signal.

A cross regulation reduction controller 140 may be, for example, a controller that includes at least current control block 110, duty cycle control block 120, and feedback controller 130. The controller 140 may be configured to control the main power switches 108A, 108B and the output power switches 118A, 118B to reduce cross regulation interference between outputs 114A, 114B. The controller 140 may be configured to regulate the DC-DC converter 102 to generate a DC voltage at each of the plurality of output nodes 114A, 114B. In some embodiments, the controller 140 may be configured to calculate the inductor current control signal 132 and the duty cycle control signal 134 based, at least in part, on a voltage at each node of the plurality of output nodes. 114A, 114B. The controller 140 may be configured to control at least one main power switch 108A, 108B to increase or decrease the current in the inductor 112 based, at least in part, on the inductor current control signal 132. In another embodiment, the controller may be configured to control at least one main power switch 108A, 108B to increase or decrease the current in the inductor 112 in each clock period so that the calculated inductor current value approximately equals the sum of the maximum and minimum current in the inductor in each period divided by two. In some embodiments, the controller 140 may also be configured to control at least one output power switch 118 to divert current from the inductor 112 to one of the plurality of output nodes 114A, 114B based, at least in part, on the calculated duty cycle control signal $D_m$ 134. By controlling the main power switches 108A, 108B and the output power switches 118A, 118B in this manner, the controller 140 may be configured to adjust an average current of at least one node 114A while maintaining an average current at other node 114B. In other words, the controller 140 may be configured to simultaneously adjust the duty cycle of the output power switches 118A, 118B and the inductor current to correct error caused by load transients on one output node while keeping current into other outputs substantially constant. This results in substantially independent control of the each of the plurality of output nodes 114A, 114B. Such control may reduce cross regulation interference. In some embodiments, maintaining the current delivered to the other outputs may include maintaining the deviation of the current delivered to the other outputs within a pre-defined range. According to one embodiment, the pre-defined range may be determined and set so as to meet a desired performance metric for the system 100, such as noise, bit error, power, speed, etc. or any combination of these or other performance metrics.

The calculated duty cycle control signal 134 may be based on a measured voltage on each of the plurality of output nodes 114A, 114B, and the calculated inductor current control signal I 132 may also be based on those measured voltages. For example, the controller 140 may receive as inputs measured voltage errors for each of the outputs 114A, 114B. A first voltage error received may be a difference between the voltage output at node 114A and a first reference voltage 115A. A second voltage error received by controller 140 may be a difference between the voltage output at node 114B and a second reference voltage 115B. Each voltage error received by controller 140 is determined based on different measured voltages at the output nodes 114A, 114B.

Figure 2:
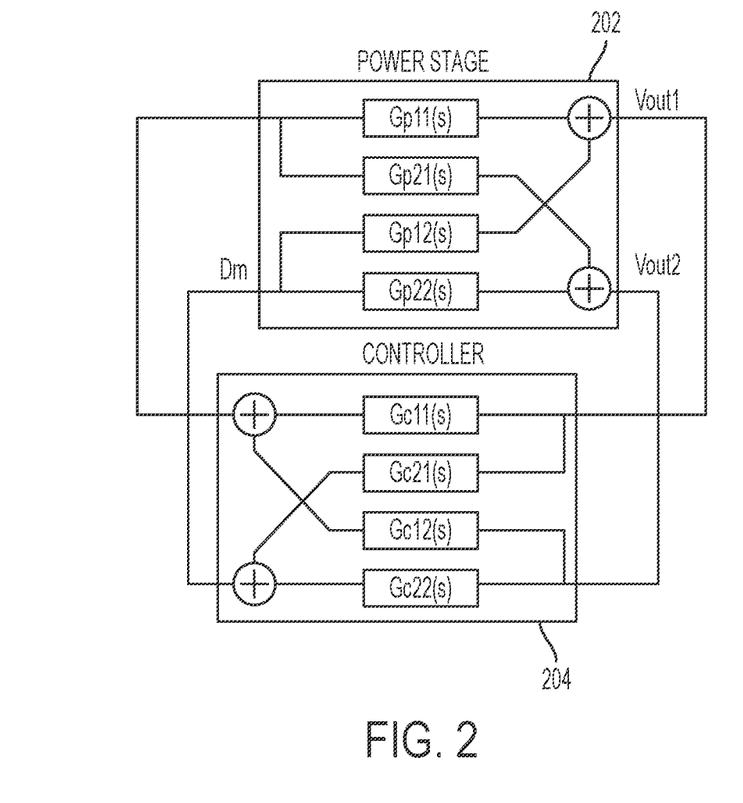
FIG. 2 is an example schematic block diagram illustrating a small signal representation of the SIMO switching DC-DC converter system with cross regulation reduction illustrated in FIG. 1 according to some embodiments of the disclosure.

In some embodiments, the inductor current control signal I 132 and the duty cycle control signal $D_m$ 134 may be determined based on an optimization of the small signal loop gain of DC-DC converter system 100. For example, FIG. 2 is an example schematic block diagram illustrating a small signal representation of a SIMO switching DC-DC converter system with cross regulation reduction illustrated according to some embodiments of the disclosure. Power stage representation 202 may represent a transfer function between the input control signals, inductor current control signal I 132, and duty cycle control signal $D_m$ 134, and the outputs nodes 114A, 114B. Controller representation 204 may represent a transfer function between the outputs nodes 114A, 114B and the input control signals, inductor current control signal I 132 and duty cycle control signal $D_m$ 134. The transfer functions for the power stage representation 202 and the controller representation 204 may be represented in matrix form as:

$$Gp = \begin{bmatrix} Gp11(s) & Gp12(s) \\ Gp21(s) & Gp22(s) \end{bmatrix},$$

$$Gc = \begin{bmatrix} Gc11(s) & Gc12(s) \\ Gc21(s) & Gc22(s) \end{bmatrix}.$$

The loop gain of the system may be represented as Gp*Gc.

As an example of determining the inductor current control signal I 132 and the duty cycle control signal $D_m$ 134 based on an optimization of the small signal loop gain, in one embodiment, Gp may be represented as:

$$Gp = \begin{bmatrix} a1*Dm & a1*I \\ a2*(1-Dm) & -a2*I \end{bmatrix}.$$

In the above equation Gp, a1 may be equal to a value based on a resistance and a capacitance of a load on the first output node 114A. For example, a1 may be determined as a1=R1/(1+sR1C1) where R1 and C1 are the output resistance at power output 114A. Similarly, a2 may be equal to a value based on a resistance and a capacitance of a load on the second output node 114B of the plurality of output nodes. For example, a2 may be determined as a2=R2/(1+sR2C2) where R2 and C2 are the output resistance at power output 114B. The equations described above may be easily modified for more than two power outputs by increasing the size of the matrices. In these equations, I is a value represented by the inductor current control signal 132, and $D_m$ is a value represented by the duty cycle control signal 134. For example, $D_m$ may be the duty cycle value for at least one output switch 118A, 118B.

In some embodiments, the desired small signal loop gain of DC-DC converter system 100 may be:

$$Gp*Gc = \begin{bmatrix} 1 & 0 \\ 0 & 1 \end{bmatrix} * \frac{\omega_u}{s}.$$

Gc may be determined as the Gc that results in the above loop gain. In other words, controller 140 may calculate Gc to be:

$$Gc = \begin{bmatrix} \frac{1}{a1} & \frac{1}{a2} \\ \frac{1-Dm}{I}*\frac{1}{a1} & \frac{-Dm}{I}*\frac{1}{a2} \end{bmatrix} * \frac{\omega_u}{s}.$$

Once Gc is known, I and $D_m$ may be calculated. For example, as illustrated in FIG. 2, I may be calculated as I=Gc11(s)+Gc12(s) or as I=Gc11(s)*(Vout–Ref1)+Gc12(s)*(Vout2–Ref2) and $D_m$ may be calculated as Dm=Gc21(s)+Gc22(s) or as Dm=Gc21(s)*(Vout1–Ref1)+Gc22(s)*(Vout2–Ref2).

In some embodiments, the inductor current control signal 132 and the duty cycle control signal 134 may be determined by cross regulation reduction controller 140 based on previous values of the inductor current control signal 132 and the duty cycle control signal 134 determined in previous clock periods as well as determined changes in the inductor current control signal 132 and the duty cycle control signal 134. For example, in each clock period, controller 140 may determine a change in the inductor current (I_change) based, at least in part, on voltage errors (Verror_n) measured on each of the plurality of output nodes (for example, Verror_1 for the voltage error associated with node 114A and Verror_2 for the voltage error associated with node 114B) within the clock period, voltage errors (Verror_n_previous) determined during the previous clock period (for example, Verror_1_previous for the previous voltage error associated with node 114A and Verror_2_previous for the previous voltage error associated with node 114B), load resistances (R_n_previous) determined during the previous clock period for each of the plurality of outputs nodes 114A, 114B (for example, R_1_previous for the resistance associated with node 114A and R_2_previous for the resistance associated with node 114B), and capacitive loading (C_n) on each of the plurality of the output nodes (for example, C_1 for the capacitive loading on output node 114A and C_2 for the capacitive loading on output node 114B). Controller 140 may then calculate the inductor current control signal I 132 in each clock period based, at least in part, on a sum of the inductor current value determined in the previous clock period (I_previous) and the change in the inductor current (I_change) determined during the clock period. For example, inductor current control signal I 132 may be set to indicate a value of I_previous+I_change*K1, where K1 is a constant.

Similarly, in each clock period, controller 140 may determine a change in the duty cycle control signal $D_m$ 134 associated with each of the plurality of output power switches 118 (D_n_change) based, at least in part, on voltage errors (Verror_n) measured on each of the plurality of output nodes (for example, Verror_1 for the voltage error associated with node 114A and Verror_2 for the voltage error associated with output node 114B) within the clock period, voltage errors (Verror_n_previous) determined during the previous clock period (for example, Verror_1_previous for the previous voltage error associated with output node 114A and Verror_2_previous for the previous voltage error associated with node 114B), load resistances (R_n_previous) determined during the previous clock period for each of the plurality of output nodes 114A, 114B (for example, R_1_previous for the resistance associated with node 114A and R_2_previous for the resistance associated with node 114B), and capacitive loading (C_n) on each of the plurality of the output nodes (for example, C_1 for the capacitive loading on output node 114A and C_2 for the capacitive loading on output node 114B), the duty cycle associated with each of the plurality of outputs in the previous clock period (D_n_previous), and a calculated inductor current value in the previous clock period (I_previous). The controller 140 may then calculate the duty cycle control signal $D_m$ 134 in each clock period based, at least in part, a sum of the calculated duty cycle value associated with each of the plurality of output nodes in the previous clock period and the calculated duty cycle value change associated with each of the plurality of output nodes during the current clock period (for example, D_n=D_n_previous+D_n_change*K2, where K2 is a constant).

In some embodiments, the change in the inductor current determined in each clock period may be proportional to the sum of the following value: (1) the voltage error of each of the plurality of output nodes measured during the clock period divided by the load resistance associated with each of the plurality of output nodes calculated during the previous clock period; (2) the time derivative of the voltage error of each of the plurality of output nodes measured during a clock period (Verror_n_derivative) multiplied by the capacitive loading of each of the plurality of output nodes. In mathematical notation, the change in the inductor current determined in each clock period may be represented as:
I_change=Σn(Verror_n/R_n_previous+ C_n*Verrror_n_derivative) for multiple outputs or as I_change=Verror_1/R_1_previous+ C_1*Verror_1_derivative+Verror_2/R_2_previous+C_2*Verror_2_derivative for two outputs.

In some embodiments, the calculated duty cycle value change associated with one of the plurality of outputs in each clock period may be proportional to the sum of the following values: (1) the measured voltage error of the output node in the clock period, divided by the calculated load resistance associated with the output node in the previous period, and divided by the calculated inductor current value in the previous period, and multiplied by the sum of duty cycle value associated with each of the plurality of output nodes minus the duty cycle value associated with the output; (2) the negative value having a magnitude equal to the sum of the measured voltage error of each of the plurality of output nodes in the clock period divided by the calculated load resistance associated with each of the plurality of output nodes in the previous clock period, and divided by the calculated inductor current value in the previous period, and multiplied by the duty cycle value associated with said output node; (3) the time derivative of the measured voltage error of the output node in the clock period, multiplied by the capacitive loading of the output node, divided by the calculated inductor current value in the previous period, and multiplied by the sum of duty cycle value associated with each of the plurality of output nodes minus the duty cycle value associated with the output; (4) the negative value having a magnitude equal to the sum of the time derivative of measured voltage error of each of the plurality of output nodes in the clock period multiplied by the capacitive loading of each of the plurality of output nodes, divided by the calculated inductor current value in the previous period, and multiplied by the duty cycle value associated with the output node. In mathematical notation, the calculated duty cycle value change associated with one of the plurality of outputs in each clock period may be represented as:

D_n_change=Verror_n/R_n_previous/I_previous*
(ΣmD_m_previous-D_n_previous)-
(ΣmVerror_m/R_m_previous)/
I_previous*D_n_previous+
Verror_n_derivative*C_n/I_previous*
(ΣmD_m_previous-D_n_previous)-
(ΣmVerror_m_derivative*C_m)/
I_previous*D_n_previous For multiple outputs or for two outputs as:

Dm_change=Verror_1/R_1_previous/I_previous*(1-
Dm_previous)-Verror_2/R_2_previous/
I_previous*Dm_previous+
Verror_1_derivative*C_1/I_previous*(1-
Dm_previous)-Verror_2_derivative*C_2/
I_previous*Dm_previous.

Figure 3A:
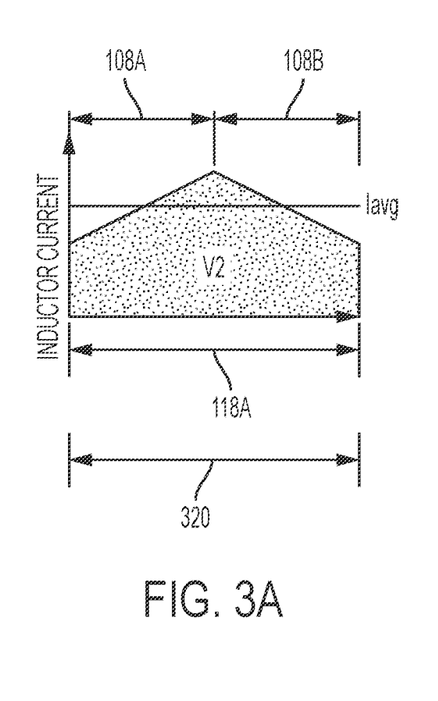
FIGS. 3A-C are illustrations of selection of a switching sequence for a duty cycle control signal in a SIMO switching DC-DC converter system with cross regulation reduction according to some embodiments of the disclosure.
Figure 3B:
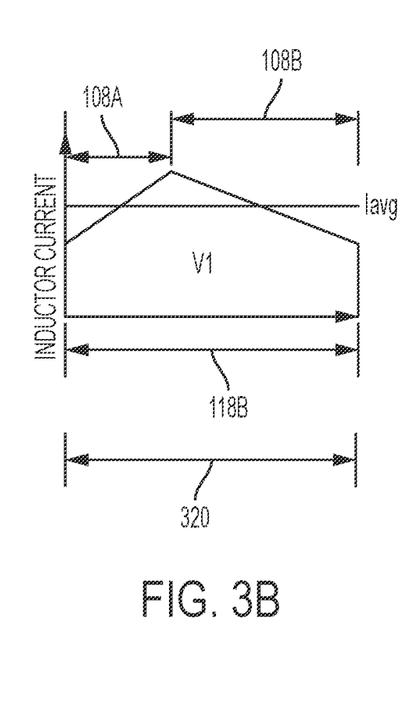
Figure 3C:
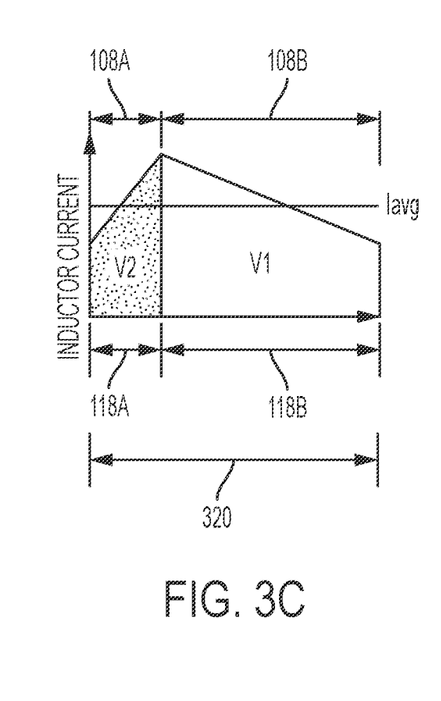

After the inductor current control signal I 132 and the duty cycle control signal $D_m$ 134 are determined by controller 140, the duty cycle control signal $D_m$ 134 may be linearized. In one embodiment, a DSM operating at a provided clock frequency may be used to linearize the duty cycle control signal 134. For example, duty cycle control block 120 may be a DSM operating at a clock frequency and that may be used to linearize the duty cycle control signal 134. Based on the linearized duty cycle control signal 134, the controller 140 may select a switching sequence for the main power switches 108A, 108B and the output power switches 118A, 118B that results in reduced cross regulation interference. In other words, the controller 140 may be configured to convert the duty cycle control signal $D_m$ 134 to one of a plurality of sequence selections. FIGS. 3A-C are illustrations of switching sequences for a duty cycle control signal in a SIMO switching DC-DC converter system with cross regulation reduction according to some embodiments of the disclosure. The duty cycle control block 120 may quantize the duty cycle control signal $D_m$ 134 to one of three different quantization values that each correspond to one of three different switching sequences. For example, quantization output 0 corresponds to switching sequence B shown in FIG. 3B, quantization output 0.4 corresponds to switching sequence C shown in FIG. 3C, and quantization output 1 corresponds to switching sequence A shown in FIG. 3A. In each switching sequence, the average inductor current, represented on a vertical axis, may be maintained constant over an entire time period 320. In switching sequence A of FIG. 3A, the output power switch 118A may be maintained ON throughout the entire time period 320, while the main power switches 108A and 108B each spend approximately the same amount of time switched ON. In switching sequence B shown in FIG. 3B, output power switch 118B may be maintained ON throughout the entire time period 320, while output power switch 108A spends less time switched ON than does output power switch 108B. In switching sequence C shown in FIG. 3C, output power switch 118A spends less time ON than does output power switch 118B, and main power switch 108A spends less time ON than does main power switch 108B. In the sequences of FIG. 3B and FIG. 3C, the ratio of time ON for switches 108A and 108B and the ratio of time ON for switches 118A and 118B may differ from that shown. In each of the sequences A, B, C, the sum of the time during which main power switch 108A is ON and the time during which main power switch 108B is ON is equal to time period 320, and the sum of the time during which output power switch 118A is ON and the time during which output power switch 118B is ON is equal to time period 320.

The number of sequences from which a switch sequence may be selected based on the linearized duty cycle control signal 134 is three as shown in FIGS. 3A-C. However, in some embodiments, the number of sequences from which a sequence may be selected based on the linearized duty cycle control signal 134 may be more or less than three. In some embodiments, the number may depend on desired performance and the configuration of various components of DC-DC converter system 100. Therefore, use of a number of sequences other than three does not cause a departure from this disclosure in spirit or scope.

According to another embodiment, the controller 140 may be configured to use a DSM to receive a plurality of duty cycle values that are each associated with one of the plurality of output nodes 114A, 114B. The controller 140 may also be configured to use a quantizer at the output of the DSM to map a plurality of continuous duty cycle values, each associated with one of the plurality of output nodes 114A, 114B, to a plurality of predetermined discrete duty cycle values, each associated with one of the plurality of output nodes 114A, 114B. The controller 140 may also be configured to use a switching sequence look-up-table (LUT) to map the predetermined discrete duty cycle values to a predetermined sequence in each clock period. In another embodiment, the controller 140 may be further configured to control at least one output switch 118A, 118B to divert the inductor current to at least one of the plurality of output nodes 114A, 114B in each clock period according to the selected predetermined sequence.

Although two output nodes with two output switches is shown in the embodiment of FIG. 1, more or less output nodes may be shared with one inductor. A DC-DC converter system, such as one similar to system 100, may have three outputs coupled to three output power switches. In such an embodiment, a controller, such as a controller similar to controller 140, may be configured to control the three output power switches according to a calculated duty cycle value, such as a value similar to duty cycle control signal $D_m$ 134, by dividing the calculated duty cycle between the three output power switches, either equally among the three nodes or non-equally among the three nodes.

In some embodiments, for example in an embodiment in which the duty cycle control signal $D_m$ 134 approaches 0 or 1, controller 140 may perform additional operations to determine the inductor current control signal I 132 and the duty cycle control signal $D_m$ 134 and to control the switching of the main power switches 108A, 108B and output power switches 118A, 118B to reduce cross regulation interference. The duty cycle may approach 0 or 1 when one load at a power output node is significantly different, such as larger, than another load at a power output node. In such a configuration, the duty cycle control signal $D_m$ 134 may be controlled by a voltage at the output node of the smaller load.

Hysteresis control may be implemented when the duty cycle control signal $D_m$ 134 approaches 0 or 1 using threshold values. In one embodiment, the controller 140 may detect that the duty cycle control signal $D_m$ 134 is below a first threshold value or above a second threshold value having a value higher than the first threshold value. If so, the controller 140 may be configured to control at least one output power switch 118A, 118B to divert current to an output node 114A or 114B that has a voltage that is below a reference voltage. Additionally, the controller 140 may be configured to calculate the duty cycle control signal $D_m$ 134 associated with the output node that has a voltage that is below the reference voltage based, at least in part, on a frequency with which the output node falls below the reference voltage. Controller 140 may also be configured to calculate the inductor current control signal I 132 based, at least in part, on the frequency with which the output node falls below the reference voltage.

Figure 4:
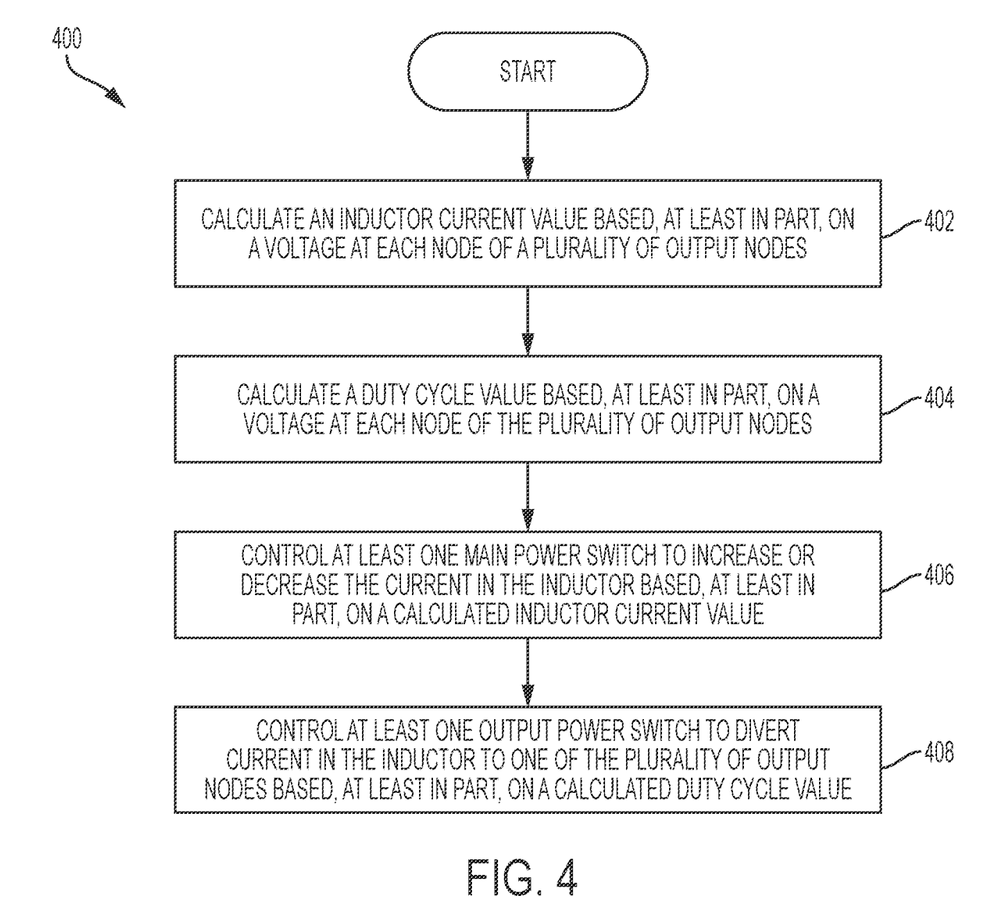
FIG. 4 is an example flow chart illustrating a method for cross regulation reduction in a SIMO switching DC-DC converter system according to some embodiments of the disclosure.

FIG. 4 is an example flow chart illustrating a method for cross regulation reduction in a SIMO switching DC-DC converter system according to one embodiment of the disclosure. Method 400 may be implemented with the systems described with respect to FIGS. 1-3 or other systems. Method 400 begins, at block 402, with calculating an inductor current value based, at least in part, on a voltage at each node of a plurality of output nodes. At block 404, method 400 includes calculating a duty cycle value based, at least in part, on a voltage at each node of the plurality of output nodes. At block 406, method 400 includes controlling at least one main power switch to increase or decrease the current through the inductor based, at least in part, on the calculated inductor current value of block 402. At block 408, method 400 includes controlling at least one output power switch to divert current from the inductor to one of the plurality of output nodes based, at least in part, on the calculated duty cycle value of block 404. When implemented in the system embodiment of FIG. 1, the functions of blocks 402 and 404 may occur in the feedback controller 130 and the functions of blocks 406 and 408 may occur in the current control controller 110 and the duty cycle controller 120, respectively. However, control logic for performing the functions described in FIG. 4 may be organized in a different manner within a controller integrated circuit (IC).

The systems described with respect to FIGS. 1-3 may also perform the step of adjusting an average current of at least one node of the plurality of output nodes while maintaining an average current at other nodes of the plurality of output nodes. For example, the average current of at least one node of the plurality of output nodes may be adjusted while the average current at other nodes of the plurality of output nodes may be maintained approximately constant by appropriately controlling the current and duty cycle signals and subsequently quantizing the duty cycle signal. When more than two output nodes are present, the calculated current and duty cycles values for operating the power switches and output switches may be based on a subset or the entire set of the voltages at the output of the plurality of nodes. Furthermore, when more than two output nodes are present, more than one inductor may be present and shared between different subsets of the output nodes.

Furthermore, the control technique of FIG. 4 and other techniques described with reference to FIGS. 1-3 for reducing cross regulation interference in the DC-DC converter 100 of FIG. 1 may also be applied to other DC-DC converters. For example, the control technique may be applied to buck converters, boost converts, and buck-boost converters.

The schematic flow chart diagram of FIG. 4 is generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The operations described above as performed by a controller may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Further, the logic circuity may be configured as a general purpose processor capable of executing instructions contained in software. If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although step-down DC-DC converters are described throughout the detailed description, aspects of the invention may be applied to the design of other converters, such as step-up DC-DC converters or other circuitry and components based on DC-DC power conversion. As another example, although specific controller and associated logic circuitry is described, the same functions may be implemented in digital signal processors (DSPs), graphics processing units (GPUs), and central processing units (CPUs). As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A single-inductor multiple-output switching DC-DC converter, comprising:
    an inductor;
    at least one main power switch coupled to the inductor;
    a plurality of output nodes;
    at least one output power switch coupled to at least one of the plurality of output nodes; and
    a controller coupled to the at least one main power switch and coupled to the at least one output power switch and configured to regulate the DC-DC converter to generate a DC voltage at each of the plurality of output nodes, wherein the controller is configured to perform steps comprising:
        calculating an inductor current value based, at least in part, on voltages at each node of the plurality of output nodes;
        calculating a duty cycle value associated with each of the plurality of output nodes based, at least in part, on the voltages at each node of the plurality of output nodes;
        controlling the at least one main power switch to increase or decrease the current in the inductor based, at least in part, on the calculated inductor current value; and
        controlling the at least one output power switch to divert current from the inductor to one of the plurality of output nodes based, at least in part, on the calculated duty cycle value associated with each of the plurality of output nodes.

2. The apparatus of claim 1, wherein the controller is further configured to perform steps comprising adjusting a first average current of at least one node of the plurality of output nodes while maintaining a second average current at other nodes of the plurality of output nodes, and wherein the calculated duty cycle value associated with each of the plurality of output nodes is based, at least in part, on a measured DC voltage on each of the plurality of output nodes, and wherein the calculated inductor current value is based, at least in part, on a measured DC voltage on each of the plurality of output nodes.

3. The apparatus of claim 2, wherein the measured DC voltage on each of the plurality of output nodes corresponds to an error voltage determined on a difference between a DC voltage on a node of the plurality of output nodes and a respective reference voltage.

4. The apparatus of claim 1, wherein the controller is configured to perform steps comprising:
    computing a matrix comprising the values of:

$$\begin{bmatrix} \frac{1}{a1} & \frac{1}{a2} \\ \frac{1-Dm}{I*a1} & \frac{-Dm}{I*a2} \end{bmatrix},$$

wherein a1 is equal to a value based on a resistance and a capacitance of a first load on a first output node of the plurality of output nodes,
    wherein a2 is equal to a value based on a resistance and a capacitance of a second load on a second output node of the plurality of output nodes,
    wherein I is equal to the inductor current value, and
    wherein Dm is equal to the duty cycle value for the at least one output switch.

5. The apparatus of claim 1, wherein the controller is further configured to perform steps comprising:
    detecting that the calculated duty cycle value associated with one of the plurality of output nodes is below a threshold value;
    controlling the at least one output power switch to divert current to an output node that has a voltage that is below a reference voltage;
    calculating the duty cycle value associated with the output node that has a voltage that is below the reference voltage based, at least in part, on a frequency with which the output node falls below the reference voltage; and calculating the inductor current value based, at least in part, on the frequency with which the output node falls below the reference voltage.

6. The apparatus of claim 1, wherein the controller is further configured to perform steps comprising linearizing the calculated duty cycle value.

7. The apparatus of claim 6, wherein the controller is further configured to convert the calculated duty cycle values associated with each of the plurality of output nodes to one of a plurality of sequence selections.

8. The apparatus of claim 1, wherein the at least one output power switch comprises at least a first power output switch, a second power output switch, and a third power output switch, and wherein the controller is configured to control the at least one output power switch according to the calculated duty cycle value by dividing the calculated duty cycle between the first power output switch, the second power output switch, and the third power output switch.

9. A method, comprising:
controlling an inductor configured to provide current to a plurality of output nodes by performing steps comprising:
calculating an inductor current value based, at least in part, on a voltage at each node of the plurality of output nodes;
calculating a duty cycle value associated with each of the plurality of output nodes based, at least in part, on a voltage at each node of the plurality of output nodes;
controlling at least one main power switch to increase or decrease the current in the inductor based, at least in part, on a calculated inductor current value; and
controlling at least one output power switch to divert current from the inductor to one of the plurality of output nodes based, at least in part, on the calculated duty cycle value associated with each of the plurality of output nodes.

10. The method of claim 9, further comprising adjusting a first average current of at least one node of the plurality of output nodes while maintaining a second average current at other nodes of the plurality of output nodes.

11. The method of claim 9, wherein the voltage at each node of the plurality of output nodes corresponds to an error voltage determined on a difference between a DC voltage on a node of the plurality of output nodes and a respective reference voltage.

12. The method of claim 9, further comprising:
computing a matrix comprising the values of:

$$\begin{bmatrix} \frac{1}{a1} & \frac{1}{a2} \\ \frac{1-Dm}{I*a1} & \frac{-Dm}{I*a2} \end{bmatrix},$$

wherein a1 is equal to a value based on a resistance and a capacitance of a first load on a first output node of the plurality of output nodes,
wherein a2 is equal to a value based on a resistance and a capacitance of a second load on a second output node of the plurality of output nodes,
wherein I is equal to the inductor current value, and
wherein Dm is equal to the duty cycle value associated with each of the plurality of output nodes for the at least one output switch.

13. The method of claim 9, further comprising:
detecting that the calculated duty cycle value associated with one of the plurality of output nodes is below a threshold value;
controlling the at least one output power switch to divert current to an output node that has a first voltage that is below a reference voltage;
calculating the duty cycle value associated with the output node that has a second voltage that is below the reference voltage based, at least in part, on a frequency with which the output node falls below the reference voltage; and
calculating the inductor current value based, at least in part, on the frequency with which the output node falls below the reference voltage.

14. The method of claim 13, further comprising converting the calculated duty cycle value associated with each of the plurality of output nodes to one of a plurality of sequence selections.

15. The method of claim 9, wherein controlling at least one output power switch comprises controlling a first power output switch, a second power output switch, and a third power output switch, and controlling each of the first, second, and third output power switches according to the respective calculated duty cycle value associated with the first, second, and third output power switches.

16. An apparatus, comprising:
a controller for regulating a DC-DC converter to generate a DC voltage at each node of a plurality of output nodes sharing an inductor by adjusting an average current of at least one node of the plurality of output nodes while maintaining an average current at other nodes of the plurality of output nodes, wherein the controller is configured to perform steps comprising:
calculating an inductor current value based, at least in part, on voltages at each node of the plurality of output nodes;
calculating a duty cycle value associated with each of the plurality of output nodes based, at least in part, on the voltages at each node of the plurality of output nodes;
controlling at least one main power switch to increase or decrease the current in the inductor based, at least in part, on a calculated inductor current value; and
controlling at least one output power switch to divert current from the inductor to one of the plurality of output nodes based, at least in part, on the calculated duty cycle value associated with each of the plurality of output nodes.

17. The apparatus of claim 16, wherein the controller is configured to perform steps comprising:
computing a matrix comprising the values of:

$$\begin{bmatrix} \frac{1}{a1} & \frac{1}{a2} \\ \frac{1-Dm}{I*a1} & \frac{-Dm}{I*a2} \end{bmatrix},$$

wherein a1 is equal to a value based on a resistance and a capacitance of a first load on a first output node of the plurality of output nodes,
wherein a2 is equal to a value based on a resistance and a capacitance of a second load on a second output node of the plurality of output nodes,
wherein I is equal to the inductor current value, and
wherein Dm is equal to the duty cycle value for the at least one output switch.

18. The apparatus of claim 16, wherein the controller is configured to perform steps comprising:

detecting that the calculated duty cycle value associated with one of the plurality of output nodes is below a threshold value;

controlling the at least one output power switch to divert current to an output node that has a first voltage that is below a reference voltage;

calculating the duty cycle value associated with the output node that has a second voltage that is below the reference voltage based, at least in part, on a frequency with which the output node falls below the reference voltage; and calculating the inductor current value based, at least in part, on the frequency with which the output node falls below the reference voltage.

19. The apparatus of claim 18, wherein the controller is configured to perform steps comprising converting the calculated duty cycle value associated with each of the plurality of output nodes to one of a plurality of sequence selections.

20. The apparatus of claim 16, wherein the voltage at each node of the plurality of output nodes corresponds to an error voltage determined on a difference between a DC voltage on a node of the plurality of output nodes and a respective reference voltage.

* * * * *